US009619970B2

(12) United States Patent
Zielinski

(10) Patent No.: US 9,619,970 B2
(45) **Date of Patent: *Apr. 11, 2017**

(54) GAMING SYSTEM AND METHOD PROVIDING A GROUP BONUS EVENT FOR LINKED GAMING DEVICES

(71) Applicant: IGT, Las Vegas, NV (US)

(72) Inventor: John H. Zielinski, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,744

(22) Filed: Sep. 18, 2015

(65) Prior Publication Data

US 2016/0012684 A1 Jan. 14, 2016

Related U.S. Application Data

(63) Continuation of application No. 14/089,232, filed on Nov. 25, 2013, now Pat. No. 9,142,094, which is a (Continued)

(51) Int. Cl.
*G06F 17/00* (2006.01)
*G07F 17/32* (2006.01)

(52) U.S. Cl.
CPC .......... *G07F 17/3276* (2013.01); *G07F 17/32* (2013.01); *G07F 17/3225* (2013.01); *G07F 17/3258* (2013.01); *G07F 17/3267* (2013.01)

(58) Field of Classification Search
CPC .. G07F 17/32; G07F 17/3276; G07F 17/3267; G07F 17/3258

(Continued)

(56) References Cited

U.S. PATENT DOCUMENTS

| | | | |
|---|---|---|---|
| 4,572,509 | A | 2/1986 | Sitrick |
| 4,813,675 | A | 3/1989 | Greenwood |

(Continued)

FOREIGN PATENT DOCUMENTS

| | | |
|---|---|---|
| EP | 0 981 119 | 2/2000 |
| GB | 2 322 217 | 12/1997 |

(Continued)

OTHER PUBLICATIONS

Auction Fever advertisement, written by Sierra Design Group, available in 2004.

*Primary Examiner* — Michael Cuff
(74) *Attorney, Agent, or Firm* — Neal, Gerber & Eisenberg LLP

(57) ABSTRACT

A gaming system and method provides a competitive group bonus event for a plurality of players playing at linked gaming devices. Upon activation of the group bonus event, a first one of the players playing at one of the gaming devices can challenge one or more other players to participate in the group bonus event. Players who accept the challenge agree to compete for one or more awards associated with the group bonus event. The players play the primary games of their respective gaming devices independently of the group bonus event. The first player to trigger a bonus game on his or her gaming device wins the group bonus event and is provided with an award. The winner of the group bonus event additionally has the opportunity to play the triggered bonus game.

20 Claims, 11 Drawing Sheets

Related U.S. Application Data continuation of application No. 11/834,213, filed on Aug. 6, 2007, now Pat. No. 8,602,865.

(58) Field of Classification Search
USPC ................................................ 463/16–20, 27
See application file for complete search history.

(56) References Cited

U.S. PATENT DOCUMENTS

| | | | |
|---|---|---|---|
| 5,560,603 | A | 10/1996 | Seelig et al. |
| 5,580,309 | A | 12/1996 | Piechowiak et al. |
| 5,618,232 | A | 4/1997 | Martin |
| 5,664,998 | A | 9/1997 | Seelig et al. |
| 5,695,400 | A | 12/1997 | Fennell, Jr. et al. |
| 5,774,544 | A | 6/1998 | Lee et al. |
| 5,779,549 | A | 7/1998 | Walker et al. |
| 5,876,284 | A | 3/1999 | Acres et al. |
| 6,012,982 | A | 1/2000 | Piechowiak et al. |
| 6,024,643 | A | 2/2000 | Begis |
| 6,128,660 | A | 10/2000 | Grimm et al. |
| 6,146,273 | A | 11/2000 | Olsen |
| 6,162,122 | A | 12/2000 | Acres et al. |
| 6,206,782 | B1 | 3/2001 | Walker et al. |
| 6,309,299 | B1 | 10/2001 | Weiss |
| 6,371,850 | B1 | 4/2002 | Sonoda |
| 6,406,369 | B1 | 6/2002 | Baerlocher et al. |
| 6,503,146 | B2 | 1/2003 | Walker et al. |
| 6,688,984 | B2 | 2/2004 | Cole |
| 6,692,354 | B2 | 2/2004 | Tracy et al. |
| 6,733,390 | B2 | 5/2004 | Walker et al. |
| 6,780,110 | B2 | 8/2004 | Baerlocher et al. |
| 6,783,457 | B2 | 8/2004 | Hughs-Baird et al. |
| 6,783,458 | B2 | 8/2004 | Mead et al. |
| 6,808,452 | B2 | 10/2004 | Baerlocher et al. |
| 6,837,788 | B2 | 1/2005 | Cannon |
| 6,837,793 | B2 | 1/2005 | McClintic |
| 6,840,856 | B2 | 1/2005 | Stern |
| 6,902,478 | B2 | 6/2005 | McClintic |
| 6,926,609 | B2 | 8/2005 | Martin |
| 7,118,477 | B1 | 10/2006 | Kellen |
| 7,288,028 | B2 | 10/2007 | Rodriquez et al. |
| 7,311,598 | B2 | 12/2007 | Kaminkow et al. |
| 7,311,604 | B2 | 12/2007 | Kaminkow et al. |
| 7,326,115 | B2 | 2/2008 | Baerlocher |
| 7,357,714 | B2 | 4/2008 | Tessmer et al. |
| 7,364,510 | B2 | 4/2008 | Walker et al. |
| 7,387,571 | B2 | 6/2008 | Walker et al. |
| 2002/0183106 | A1 | 12/2002 | Cole |
| 2003/0224852 | A1 * | 12/2003 | Walker .................... G07F 17/32 463/20 |
| 2003/0236114 | A1 | 12/2003 | Griswold et al. |
| 2004/0002389 | A1 | 1/2004 | Sartini |
| 2004/0067792 | A1 | 4/2004 | Baerlocher et al. |
| 2004/0087374 | A1 | 5/2004 | Cole |
| 2004/0204235 | A1 | 10/2004 | Walker et al. |
| 2004/0204243 | A1 | 10/2004 | De Mello Costa |
| 2005/0014554 | A1 | 1/2005 | Walker et al. |
| 2005/0043088 | A1 | 2/2005 | Nguyen et al. |
| 2005/0043089 | A1 | 2/2005 | Nguyen et al. |
| 2005/0043094 | A1 | 2/2005 | Nguyen et al. |
| 2005/0049049 | A1 | 3/2005 | Griswold et al. |
| 2005/0054437 | A1 | 3/2005 | Baerlocher et al. |
| 2005/0137014 | A1 | 6/2005 | Vetelainen |
| 2005/0261058 | A1 | 11/2005 | Nguyen et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046822 | A1 | 3/2006 | Kaminkow et al. |
| 2006/0116189 | A1 | 6/2006 | Tessmer et al. |
| 2006/0121990 | A1 | 6/2006 | O'Kelley et al. |
| 2006/0135264 | A1 | 6/2006 | Shaw et al. |
| 2006/0136297 | A1 | 6/2006 | Willis et al. |
| 2006/0154710 | A1 | 7/2006 | Serafat |
| 2006/0160623 | A1 | 7/2006 | Lee |
| 2006/0229134 | A1 | 10/2006 | Briggs et al. |
| 2006/0247010 | A1 | 11/2006 | Gagner |
| 2006/0247011 | A1 | 11/2006 | Gagner |
| 2006/0247012 | A1 | 11/2006 | Walker et al. |
| 2006/0252546 | A1 | 11/2006 | Castellari et al. |
| 2006/0259623 | A1 | 11/2006 | Crawford et al. |
| 2007/0021215 | A1 | 1/2007 | Russell et al. |
| 2007/0054732 | A1 | 3/2007 | Baerlocher |
| 2007/0054733 | A1 | 3/2007 | Baerlocher |
| 2007/0060247 | A1 | 3/2007 | Low et al. |
| 2007/0060252 | A1 | 3/2007 | Taylor |
| 2007/0072682 | A1 | 3/2007 | Crawford et al. |
| 2007/0077985 | A1 | 4/2007 | Walker et al. |
| 2007/0077990 | A1 | 4/2007 | Cuddy et al. |
| 2007/0087832 | A1 | 4/2007 | Abbott et al. |
| 2007/0093291 | A1 | 4/2007 | Hulvey |
| 2007/0093294 | A1 | 4/2007 | Serafat et al. |
| 2007/0126186 | A1 | 6/2007 | Crawford et al. |
| 2007/0149292 | A1 | 6/2007 | Kaminkow et al. |
| 2007/0155485 | A1 | 7/2007 | Cuddy et al. |
| 2007/0167217 | A1 | 7/2007 | Kaminkow et al. |
| 2007/0265092 | A1 | 11/2007 | Betteridge |
| 2008/0020822 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020847 | A1 | 1/2008 | Kniesteadt et al. |
| 2008/0032764 | A1 | 2/2008 | Cannon |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0081690 | A1 | 4/2008 | Baerlocher et al. |
| 2008/0081691 | A1 | 4/2008 | Baerlocher et al. |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |

FOREIGN PATENT DOCUMENTS

| | | |
|---|---|---|
| WO | WO 96/25725 | 8/1996 |
| WO | WO 98/00210 | 1/1998 |
| WO | WO 98/51384 | 11/1998 |
| WO | WO 02/17250 | 2/2002 |
| WO | WO 2004/046859 | 6/2004 |
| WO | WO 2004/069356 | 8/2004 |
| WO | WO 2005/094347 | 10/2005 |
| WO | WO 2007/034212 | 3/2007 |
| WO | WO 2007/041163 | 4/2007 |
| WO | WO 2007/044655 | 4/2007 |
| WO | WO 2007/044908 | 4/2007 |
| WO | WO 2008/045398 | 4/2008 |

* cited by examiner

GAMING SYSTEM AND METHOD PROVIDING A GROUP BONUS EVENT FOR LINKED GAMING DEVICES

PRIORITY CLAIM

This application is a continuation of, and claims priority to and the benefit of, U.S. patent application Ser. No. 14/089,232, which was filed on Nov. 25, 2013, which is a continuation of, and claims priority to and the benefit of, U.S. patent application Ser. No. 11/834,213, which was filed on Aug. 6, 2007 and issued as U.S. Pat. No. 8,602,865 on Dec. 10, 2013, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., one penny, nickel, dime, quarter or dollar) up to a maximum number of credits, such as five credits. This wager may be made by the player a single time or multiple times in a single play of a primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Certain secondary or bonus games include a group gaming aspect wherein a plurality of players playing at linked or related gaming devices participate in a group event for one or more bonus events or awards. To increase player enjoyment and excitement with gaming devices, it is desirable to provide new and different linked or related gaming machines.

SUMMARY

The present disclosure generally relates to gaming systems and methods, and more particularly, to a gaming system and method providing a group bonus event in which a plurality of players compete against one another for one or more awards.

One embodiment of the present disclosure provides a gaming system including a central server, central controller, or remote host configured to communicate with or link to a plurality of gaming devices. In one embodiment, each of the gaming devices includes at least one primary or base game operable upon a wager by a player and at least one secondary or bonus game operable upon a triggering event. Upon activation of a group bonus event associated with the gaming system, one of the players playing at one of the gaming devices in the gaming system is enabled to challenge players playing at other gaming devices in the gaming system to participate in the group bonus event. Players who accept the challenge will compete against the challenging player and each other in the group bonus event. In one embodiment, the players participating in the group bonus event place wagers to play their respective primary games, wherein a portion of each wager is allocated to a group bonus meter. The first player to trigger the secondary or bonus game on his or her respective gaming device wins the group bonus event. The central controller awards the amount displayed in the group bonus meter to the player playing at that gaming device.

It should be appreciated that, in one embodiment, when players playing at the gaming devices of the gaming system agree to participate in the group bonus event, this does not affect the primary or bonus games of the participating players' gaming devices. That is, the group bonus event occurs independently of game play. Moreover, in one embodiment, when one of the players participating in the group bonus event triggers the bonus game of his or her gaming device, that player wins the award associated with the group bonus event and also has the opportunity to play the bonus game in a conventional manner. Accordingly, the group bonus event of the present disclosure adds functionality without affecting the primary games and bonus games of the gaming devices. The present disclosure can thus be implemented on any gaming machines without affecting the paytables of such gaming machines. The present disclosure can be employed on different primary games.

The group bonus event associated with the gaming system is activated in any suitable manner. In one embodiment, the group bonus event is activated based on an event that occurs in a play of a primary game on one of the gaming devices. In other embodiments, the event that activates the group bonus event is based on an event that is random and independent of game play, such as a randomized time or set time of day. In another embodiment, the group bonus event is activated when one of the players playing at one of the gaming devices in the gaming system chooses to activate the group bonus event. For example, a player can activate the group bonus event by pressing a button on his or her gaming device which automatically initiates the group bonus event.

Once the group bonus event is activated, one of the players playing at a gaming device in the gaming system is enabled to challenge one or more players playing at another one of the gaming devices to compete in the group bonus event. In one embodiment, the challenging player can challenge one or more players playing at an adjacent gaming device. That is, the challenging player has the option to challenge one or more of the players playing at the gaming devices directly to the right and to the left of the challenging player's gaming device. In another embodiment, the challenging player can challenge one or more other players who are playing at a gaming device located in a different gaming establishment or casino from the challenging player's gaming device. In an alternative embodiment, the players are playing over the internet.

In one embodiment, a central server or controller in communication with each of the gaming devices selects which of the players will be paired or grouped together for the group bonus event. Players may be matched to compete in the group bonus event based on any suitable criteria, including but not limited to player status, player wagering level, and player likelihood of winning the bonus event.

In one embodiment, the challenging player's gaming device displays a screen or menu which enables that player to select which of the other players he wishes to challenge. In one embodiment, the display device displays a menu including one or more selectable options. For example, one menu includes three selectable options, wherein the challenging player can choose to challenge the player to the right, the player to the left, or both of the players playing at the adjacent gaming devices on the right and left. In one such embodiment, the challenging player picks one or more of the selectable options via an input device, such as a touch screen or player controls or buttons.

After receiving a challenge to participate in the group bonus event, each challenged player can accept or refuse the challenge. In one embodiment, a countdown or time period is provided in which the challenged players can elect to accept the challenge. In one embodiment, the players may be required to place an initiation fee when they agree to participate in the challenge. In different embodiments, the initiation fee to enter the bonus event may be a cash value, a number of player points that the player must pay, or any other suitable fee or payment.

Once the challenged players agree to participate in the group bonus event, the players can place wagers to play their respective primary games. As the players play the primary games, a percentage or portion of each wager placed to play the primary game is dedicated to an accumulated value pool associated with the group bonus event. The amounts allocated to the accumulated value pool are displayed to the players on a group bonus meter. As the players continue placing wagers to play the primary games of their respective gaming devices, the amount displayed in the group bonus meter increments or increases.

In one embodiment, the first player participating in the group bonus event to achieve a group bonus event winning condition is provided with the amount displayed in the bonus event meter. In one embodiment, each of the gaming devices in the gaming system is associated with a primary or base game operable upon a wager and a secondary or bonus game operable upon a triggering event. In one such embodiment, the group bonus event winning condition is met when one of the gaming devices triggers the secondary or bonus game associated with that gaming device. In this embodiment, the first player playing at one of the gaming devices to trigger the secondary or bonus game on his or her respective gaming device wins the group bonus event and is provided with the amount displayed in the group bonus meter.

It should be appreciated that the longer it takes for one of the players to achieve the group bonus event winning condition on his or her respective gaming device, the greater the amount in the group bonus meter. It should also be appreciated that having a greater number of competitors in the group bonus event causes the amount in the bonus event meter to rise at a faster rate and causes the average expected payout for overall game play to increase.

The accumulated value pool associated with the group bonus event may accumulate in any suitable manner. In one embodiment, the accumulated value pool accumulates based on player coin-in or amounts wagered on the plays of the primary games of the gaming devices in the gaming system. In another embodiment, the accumulated value pool accumulates via side bets placed by players. In one such embodiment, players must place the side bet in addition to the wager for each play of the primary game that the player wishes to participate in the group bonus event. In one embodiment, the side bet must be of at least a designated amount. In one embodiment, each side bet placed by each of the players must be equal or substantially equal. For example, each player must place a side bet of ten additional credits per play of the primary game. The side bets place by the players are allocated to the accumulated value pool and displayed in the group bonus meter.

It should also be appreciated that when a player places the side bet in addition to the wager for the primary game, in one embodiment, the side bet does not affect primary game play. The average expected payout of the primary game on each player's gaming device is based on the paytable employed in that primary game. The symbol combinations of the paytable, the chance of the symbol combinations occurring, and their respective awards determine the average expected payback for the primary game. Placing the side bet in addition to the wager enables a player to continue participating in the group bonus event, but does not affect the paytable of the primary game. Accordingly, challenged players who decline to participate in the group bonus event and, thus, do not have to place the side bet, continue playing the primary games of their respective gaming devices with the primary game paytable. In other words, no changes are made to the primary game. In addition, the group bonus event does not affect any individual bonus games already on the gaming devices.

In one embodiment, each of the players participating in the group bonus event has an equal chance of winning the group bonus event. In another embodiment, a player's chance of winning the group bonus event is based on the player's rate of play. For example, in one such embodiment, if a player is wagering on the primary game more frequently, that player contributes more heavily to the accumulated value pool because that player is placing a greater number of wagers in a given amount of time. Therefore, the player will have a better chance of winning the amount displayed in the group bonus meter. In another embodiment, a player's chance of winning the group bonus event is based on the player's wager level. That is, players wagering in larger increments in the primary game will have a better chance of winning the group bonus event. In various alternative embodiments, the player's chance of winning the group bonus event is randomly determined, predetermined, determined based on player status, or determined in any other suitable manner.

In certain embodiments, the players who agree to participate in the group bonus event continue competing for the award associated with the group bonus event until one of the players wins or until one of the players stops playing or making the required side bet in the primary game. In various alternative embodiments, a player will be considered to have stopped playing when: (i) a designated amount of time has elapsed wherein the player has not placed a wager to play the primary game, (ii) the player's rate of play drops below a designated level, or (iii) when any other suitable criteria is met. If it is determined that a player has stopped playing or stopped making the side bets to fund the accumulated value pool, that player forfeits his or her stake in the group bonus event. Thus, any side bets previously placed by that player remain in the accumulated value pool.

In one embodiment, when one of the players wins the group bonus event, the casino or game operator keeps a percentage or portion of the amount in the bonus event meter as profit. In one embodiment, once a player is determined to have won the group bonus event, the other participating players are notified, and any players who wish to continue participating in the group bonus event must agree to do so.

It is therefore an advantage of the present disclosure to provide a gaming system which enables players to engage in competitive play.

Another advantage of the present disclosure is to provide a gaming system which enables players playing at adjacently arranged gaming devices to compete against each other for one or more awards.

A further advantage of the present disclosure is to provide a gaming system which enables players to accept or reject a challenge to participate in a group bonus event.

Additional features and advantages of the disclosed embodiments are described in, and will be apparent from, the following Detailed Description of the Invention and the Figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
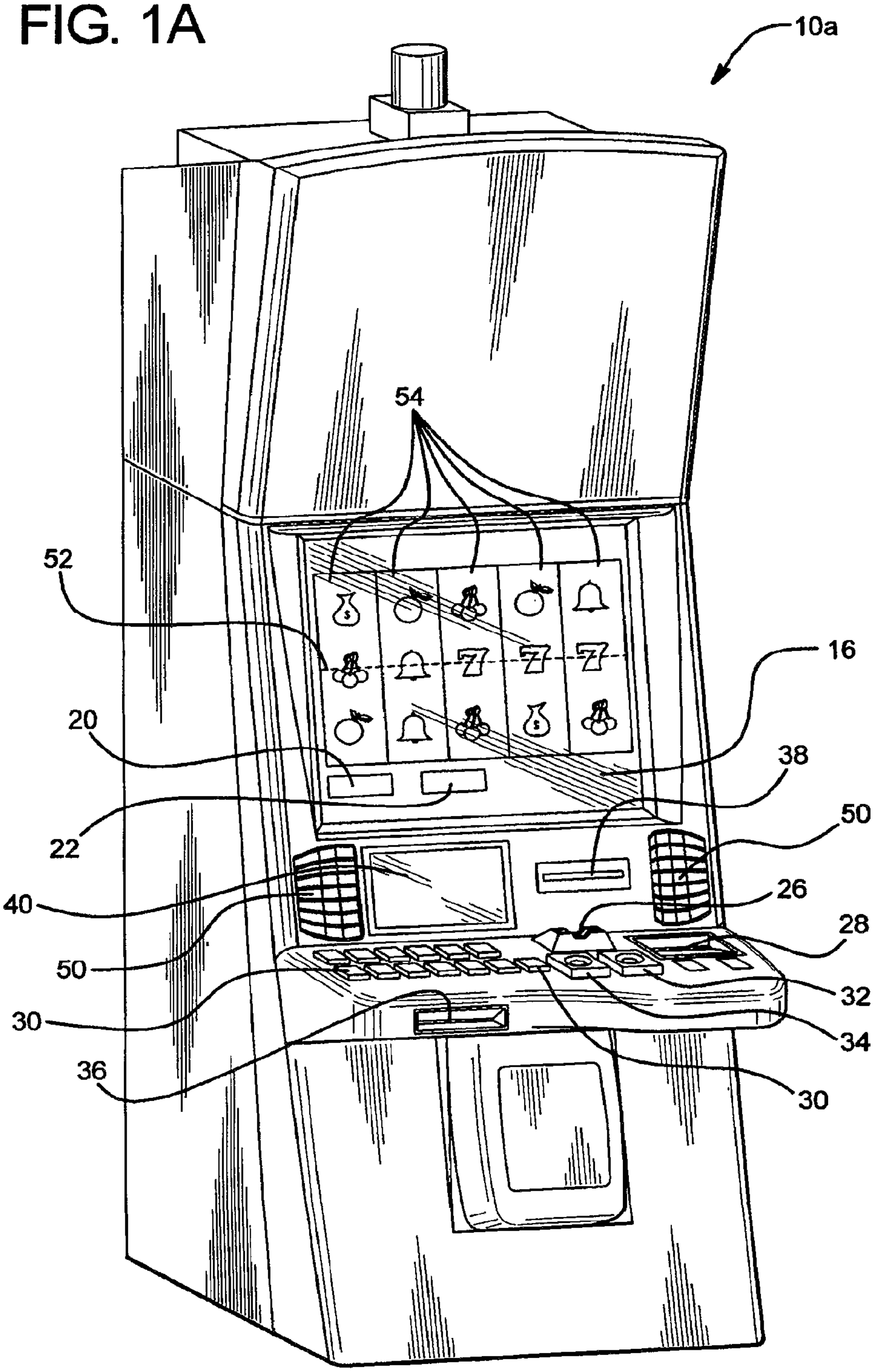
FIGS. 1A and 1B are perspective views of example alternative embodiments of the gaming device of the present disclosure.
Figure 1B:
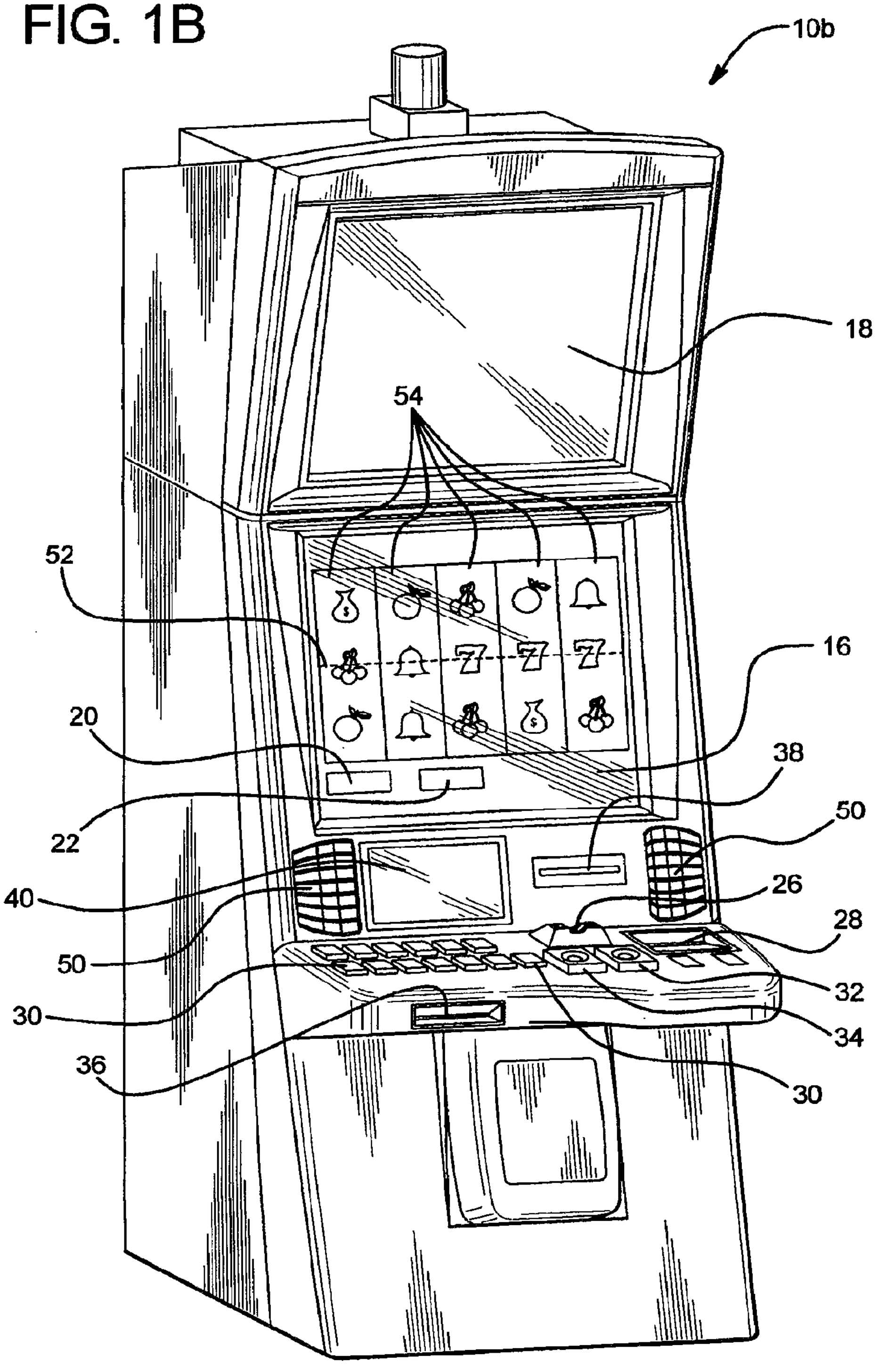

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
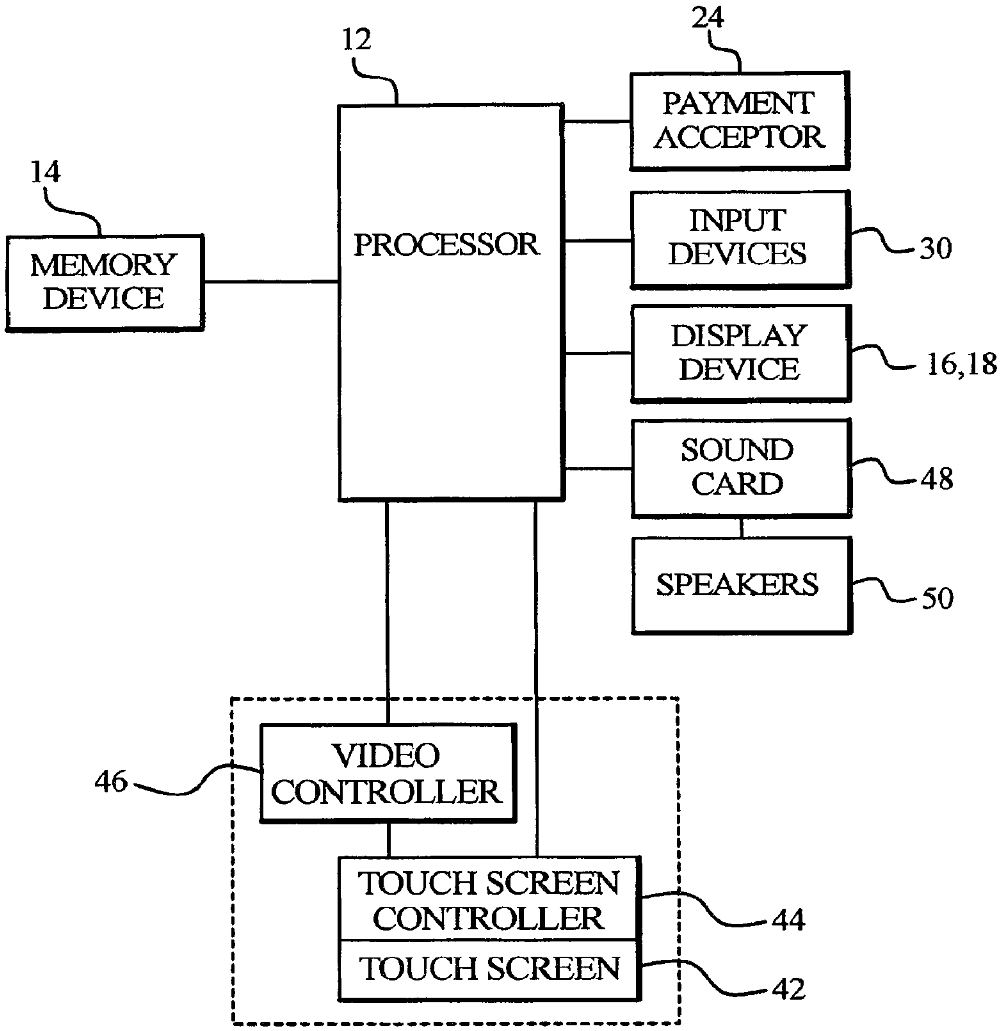
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
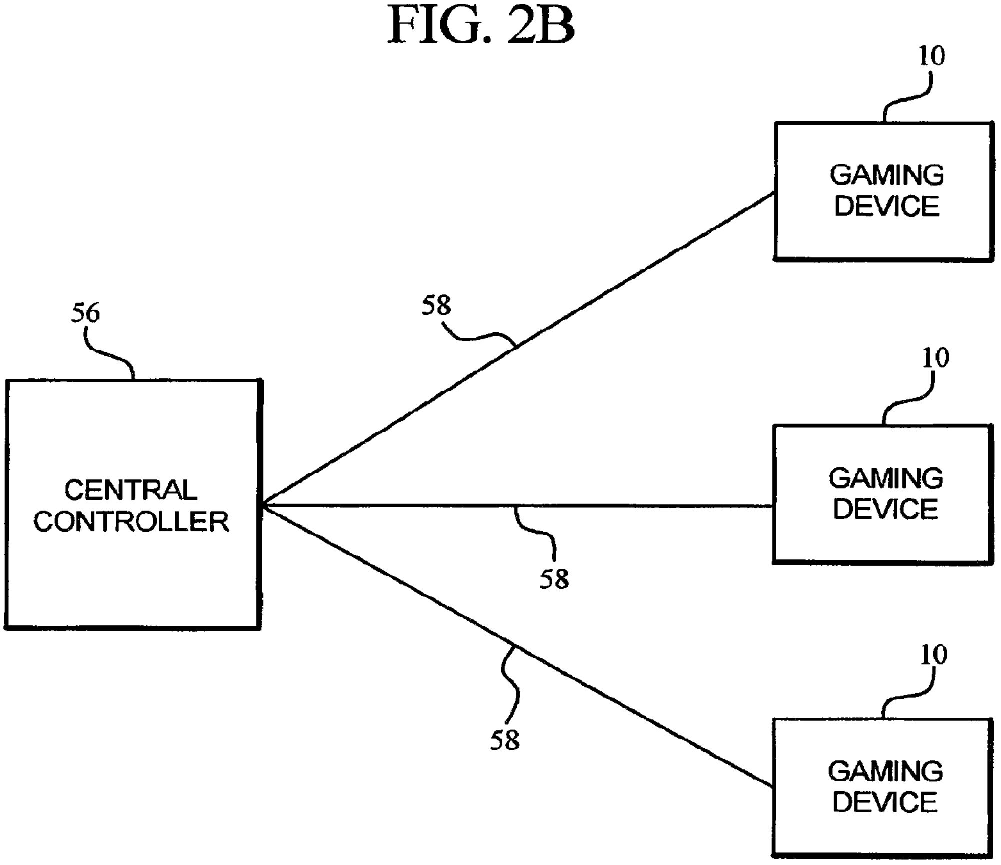
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer.

In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of gaming devices in a gaming system participate in a group gaming environment wherein the players work in conjunction with one another (i.e., as a team or group) to win one or more awards. In one such embodiment, any award won by the group is shared, either equally or based on any suitable criteria, amongst the different players of the group.

Group Bonus Event for Linked Gaming Devices

Figure 3:
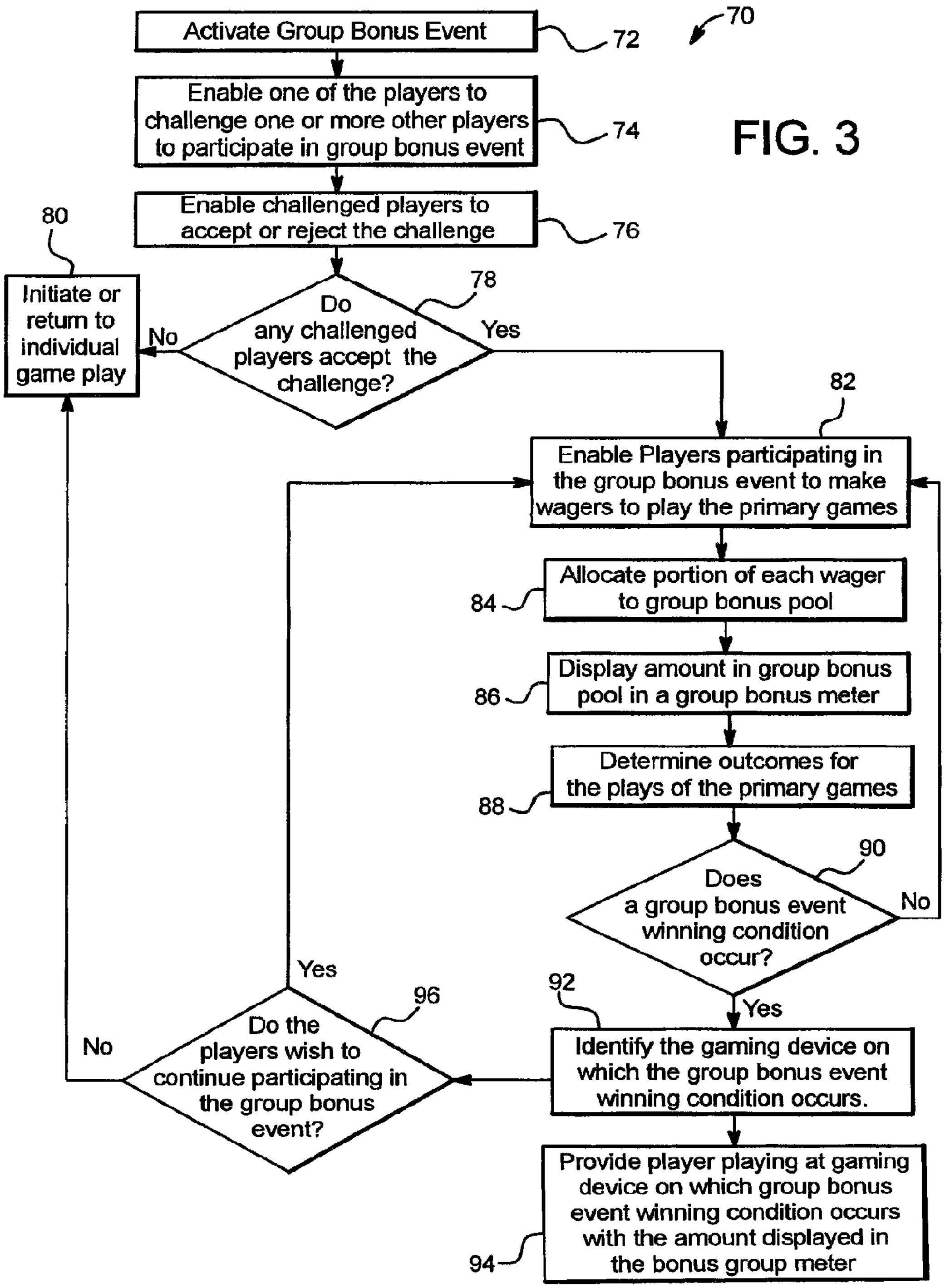
FIG. 3 is flow chart illustrating one embodiment of the present disclosure.

Referring now to FIG. 3, one embodiment of the present disclosure operates according to sequence 70. One embodiment of the present disclosure provides a gaming system including a central server or controller in communication with or linked to a plurality of gaming machines or gaming devices. Another embodiment of the present disclosure provides a gaming system having a plurality of linked gaming machines where one of the gaming machines functions as the central server or controller. Each of the gaming devices includes at least one primary or base game operable upon a wager by a player. In some embodiments, each gaming device may have one or a plurality of different primary games. In certain embodiments, the primary games of each gaming device or a plurality of the gaming devices may be the same games or different games. In one embodiment, each of the gaming devices further includes at least one secondary or bonus game operable upon a triggering event.

As indicated by block 72, a group bonus event associated with the gaming system is activated. In one embodiment, upon activation of the group bonus event, the gaming devices in the gaming system are each provided with an indication, such as a light, a sound, a message, an animation or cartoon, a video, or any other suitable indication that alerts the players playing at the gaming devices that the group bonus event has been activated.

It should be appreciated that the group bonus event can be activated in any suitable manner. In one embodiment, the group bonus event is activated based on an event that occurs in a play of a primary game on one of the gaming devices. For example, in one embodiment, the event that activates the group bonus event is a symbol-driven event, such as an occurrence of a designated symbol or symbol combination, during a play of the primary game on one of the gaming devices. In other embodiments, the event that activates the group bonus event is based on events that are random and independent of game play, such as a randomized time or set time of day. In different embodiments, the group bonus event may be activated based on at least one of: (i) an amount of time played on one or more gaming devices; (ii) a random time of the day; (iii) an amount of money wagered on one or more gaming devices; (iv) an amount of money lost by one or more gaming devices; (v) an amount of money won by one or more gaming devices; (vi) upon an event or outcome occurring in the primary game of one of the gaming devices; (vii) upon an event occurring due to a shared random outcome generation; (viii) upon a mystery trigger that is not readily apparent to the player; (ix) any other suitable event; and (x) any combination of the above. In another embodiment, the group bonus event is activated when one the players playing at one of the gaming devices in the gaming system chooses to activate the group bonus event. For example, a player can activate the group bonus event by pressing a button on his or her gaming device which automatically initiates the group bonus event.

As indicated by block 74, upon activation of the group bonus event, one of the players playing at a gaming device in the gaming system is enabled to challenge one or more of the players playing at another gaming device in the gaming system to participate in the group bonus event. In one embodiment, the player who is enabled to challenge other players (i.e., the challenging player) is the player playing at the gaming device on which the event that activated the group bonus event occurred. In one embodiment, the challenging player can challenge the players playing at adjacent gaming devices. That is, the challenging player can challenge players playing at the gaming devices directly to the right and to the left of the challenging player's gaming device. In other embodiments, the challenging player can challenge one or more other players who are playing at gaming devices located in different gaming establishments or casinos from the challenging player's gaming device.

In one embodiment, the challenging player's gaming device displays a screen or menu which enables the player to select which other players to challenge. In one embodiment, the menu includes one or a plurality of the selectable options. For example, one menu includes three selectable options, wherein the challenging player can choose to challenge the player to the right, the player to the left, or both players playing at adjacent gaming devices. In such an embodiment, the challenging player selects one or more of the selectable options via an input device such as a touch screen or player controls or buttons. In other embodiments, players can select which player or players they wish to challenge by keying in one or more player identification numbers or one or more gaming device identification numbers to find particular players. In some embodiments, players can establish personalities for their gaming session. In one such embodiment, players create animated avatars to represent themselves.

In one embodiment, when a player challenges one or more players to participate in the group bonus event, the challenged players are each provided with an indication that they have received a challenge. In one embodiment, the indication is a message that appears on the display device of each challenged players' gaming device. In one embodiment, this is accomplished by using large text on a screen and activated from touch screen or table buttons. In other embodiments, in addition to or instead of displaying the indication on the display device of each challenged player's gaming device, the indication appears on a shared display associated with the gaming system, as further discussed below.

In one embodiment, upon receiving a challenge to participate in the group bonus event, challenged players can accept or refuse the challenge to participate in the group bonus event, as indicated by block 76. Alternatively, in one embodiment, when a player receives a challenge to participate in the bonus event, the player is required to accept the challenge. By accepting the challenge, a player agrees to participate in the group bonus event, along with the challenging player and any other player who accepts the challenge.

Figure 4A:
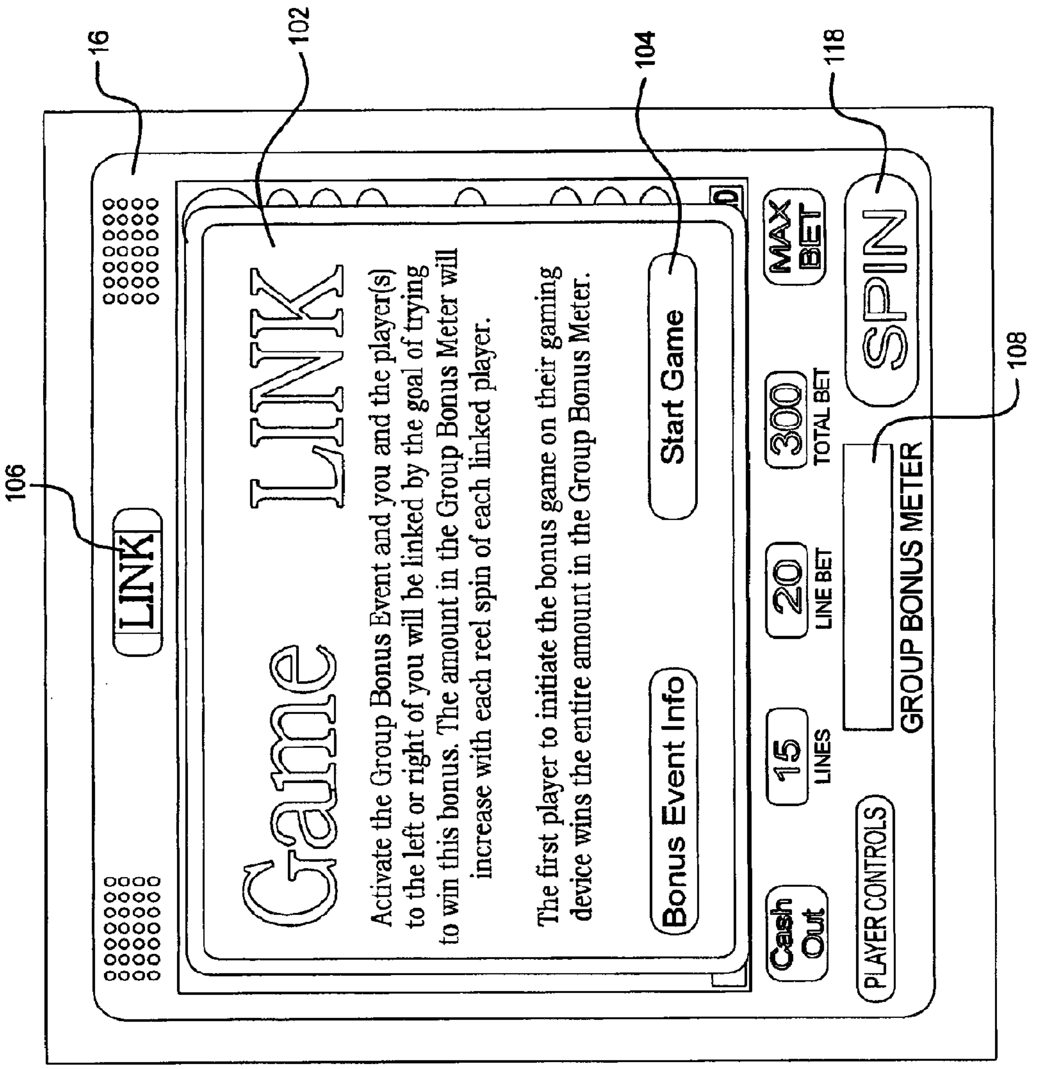
FIGS. 4A, 4B, 4C, and 4D are enlarged front plan views of one example embodiment of the gaming device disclosed herein.

FIGS. 4A to 4D illustrate an example of how, in one embodiment, a player challenges other players playing at adjacent gaming devices to participate in the group bonus event. As seen in FIG. 4A, the gaming device 10 displays a message 102 to the player informing the player that, if the player activates the group bonus event while playing on that gaming device 10, the player will have the opportunity to "link" with players playing at adjacent gaming devices for the group bonus event. That is, the player will have the opportunity to participate in the group bonus event with the any other players who agree to elect to participate in the group bonus event.

As seen in FIG. 4A, the display device 16, 18 includes a link indication 106. In this embodiment, the link indication 106 is a light that illuminates when a player is actively participating in the group bonus event. Because the gaming device 10 is currently not participating in the group bonus event (i.e., the group bonus event has not yet been activated), the link indication 106 is not illuminated. The display device further includes a group bonus meter 108. The group bonus meter 108 is empty in FIG. 4A, which indicates to the player that no amounts of money have been allocated to the group bonus meter 108. It should be appreciated that, in some embodiments, the group bonus meter does not start out empty or at zero. In such embodiments, the group bonus meter 108 starts with an initial amount of money, such as an amount funded by marketing dollars or a predetermined reset amount having a value that is determined based on any suitable criteria. By pressing the start game button 104, the player begins primary game play.

Figure 4B:
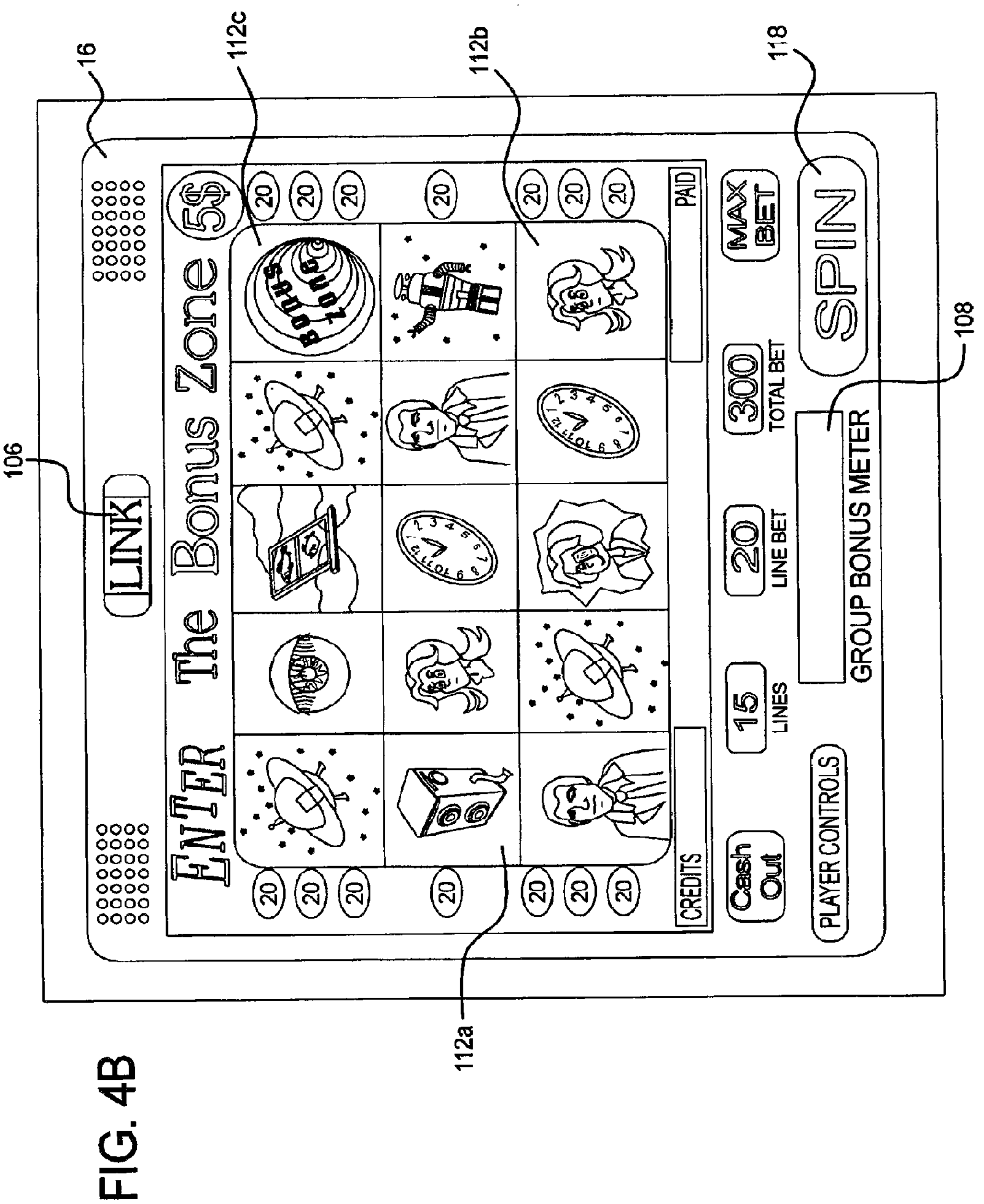

As seen in FIG. 4B, the player initiates a play of the primary game by placing a wager and pressing the spin button 118. The gaming device generates a plurality of symbols 112 in the play of the primary game. The generated symbols 112 include a "bonus zone" symbol 112*c*. In this example, an occurrence of the bonus zone symbol 112*c* during a play of the primary game causes the group bonus event to become activated (i.e., the activating event). It should be appreciated, however, that the activating event may be any suitable event that occurs during primary game play or an event that is random and independent of game play.

Figure 4C:
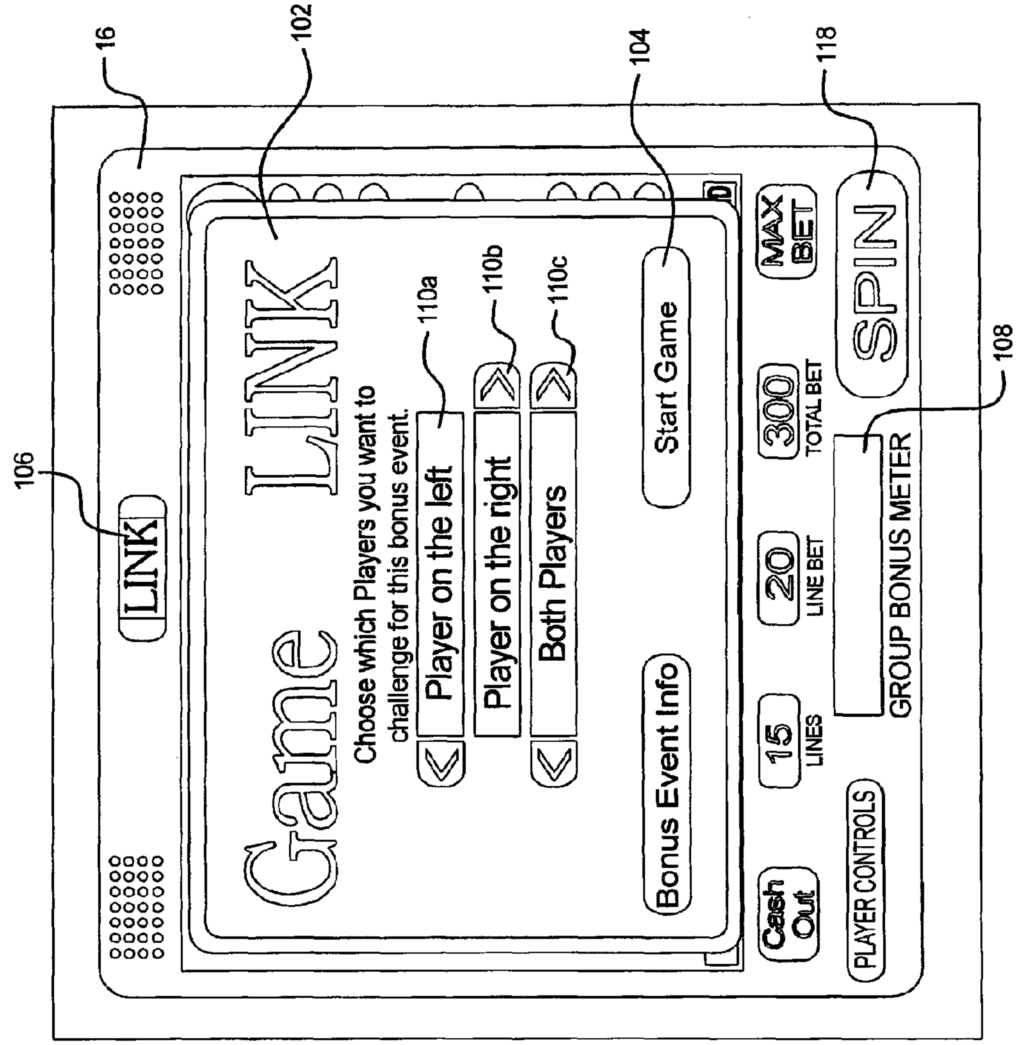

As seen in FIG. 4C, upon activation of the group bonus event, the gaming device displays a message 102 including a menu with a plurality of selectable options 110. The menu indicates that the player playing at that gaming device can challenge the player to the left 110*a*, the player to the right 110*b*, or both players 110*c* to participate in the group bonus event.

Figure 4D:
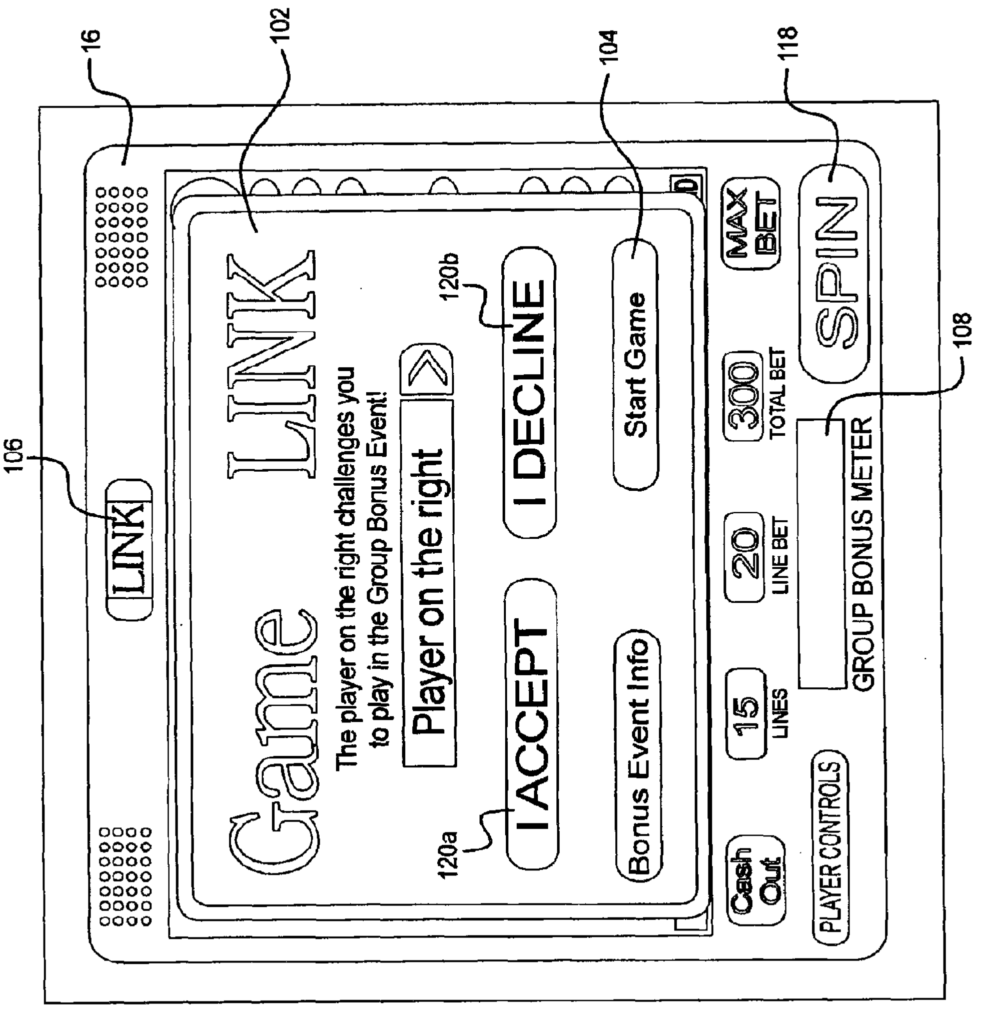

FIG. 4D illustrates the display device of the player playing the gaming device directly to the left of the challenging player's gaming device. The challenging player's gaming device is located to the right of the challenged player's gaming device. Thus, in FIG. 4D, the gaming device displays a message 102 indicating that the player to the right (i.e., the challenging player) has challenged the player to participate in the group bonus event. The challenged player has the option to accept or decline the challenge by pressing one of the accept or decline buttons 120*a* and 120*b*, respectively. In one embodiment, a countdown or time period is provided in which the challenged players can elect to join in group bonus event. For example, after a player receives a challenge to participate in the group bonus event, that player has one minute to accept the challenge.

Referring again to FIG. 3, after the challenging player has challenged one or more of the players playing at adjacent gaming devices and the challenged players have had the opportunity to accept or reject the challenge, the central controller determines whether any of the challenged players accept the challenge to participate in the group bonus event, as indicated by diamond 78. If none of the challenged players accept the challenge, individual game play continues, as indicated by block 80.

In one embodiment, if any of the players accept the challenge and, therefore, agree to participate in the group bonus event, those players are each provided with an indication, such as a message, one or more lights, or an alarm or siren, which visually and/or audibly informs the players that they are participating in the group bonus event. In one such embodiment, the indication is displayed on the display devices of the players' individual gaming devices. In other embodiments, in addition to or instead of displaying the indication on the display device of the each player's individual gaming device, the indication appears on a shared display associated with the gaming system to inform all of the players in the gaming system which players are participating in the group bonus event and which players are not participating in the group bonus event.

The players who have agreed to participate in the group bonus event may place wagers to play their respective primary games, as indicated by block 82. In one embodiment, the central controller tracks the total or partial coin-in or wagers placed on the primary games for each of the gaming devices in the gaming system. As players play the gaming devices, a percentage or portion of each wager placed to play the primary game is allocated to an accumulated value pool associated with the group bonus event, as indicated by block 84. The amounts allocated to the accumulated value pool are displayed to each of the players on a group bonus meter, as indicated by block 86. In one embodiment, the display device of each individual gaming device displays the group bonus meter to the player playing at that gaming device. In other embodiments, in addition to or instead of displaying the group bonus meter on the display devices of each individual gaming device, the group bonus meter is displayed on a shared display associated with the gaming system.

It should be appreciated that the accumulated value pool may accumulate in any suitable manner. In one embodiment, the accumulated value pool accumulates based on player coin-in or amounts wagered on the plays of the primary games of the gaming devices in the gaming system. In one embodiment, the accumulated value pool accumulates via side bets placed by the players. In one such embodiment, when players agree to participate in the group bonus event, the players must place a side bet for each play of the primary game. That is, the players must place a side bet in addition to the primary game wager on the primary game. In one embodiment, the side bet placed by each player must be of at least a designated amount. In one such embodiment, each side bet placed by each of the players must be equal or substantially equal. For example, each player must place a side bet of ten additional credits per play of the primary game. The side bets or a portion of the side bets placed by the players are allocated to the accumulated value pool and displayed in the group bonus meter.

In one embodiment, a defined relationship or ratio exists between a primary game wager for a first one of the gaming devices and the side bet (required to participate in the group bonus event) placed by another player at a second one of the gaming devices. In one embodiment, the side bet placed by a second player at a second one of the gaming devices must be at least a predefined portion or percentage of a primary game wager at a first gaming device. In one such embodiment, the side bet placed by the second player must be at least a designated portion or percentage of the maximum wager which may be placed on the primary game of the first gaming device. For example, if the first player at gaming device 14*a* is betting 100 coins and 5% or 5 coins of the first player's wager funds the group bonus event (with the remaining 95% or 95 coins funding the play of the primary game), then a second player at gaming device 14*b* must place a side bet or side wager of 5 coins to remain an active participant in the group bonus event.

If the second player at gaming device 14*b* is betting 500 coins and 2% of the player's wager (i.e., 10 coins) funds the group bonus event (with the remaining 98% or 490 coins funding the play of the primary game), then the first player at gaming device 14*a* must place a side bet or side wager of 10 coins to continue participating in the group bonus event. Accordingly, this provides for equal betting among the players participating in the group bonus event.

In another embodiment where equal side bets are not required, a weighted entry into the group bonus event is utilized. In this embodiment, for each side bet placed, the gaming system determines the chances of winning the group bonus event in relation to the player's side bet wager amount, wherein the greater the side bet, the greater the odds of winning the amount in the group bonus meter. Referring back to the above example, the second player at gaming device 14*b* is still betting 500 coins with 2% (10 coins) going to fund the group bonus event. Meanwhile, the first player at gaming device 14*a* has increased their side wager to 20 coins. Accordingly, the central server appropriately weights both player's chances such that the first player at gaming device 14*a* now has twice the chance to win the group bonus event than the second player at gaming device 14*b*. That is, because the first player at gaming device 14*a* is contributing to the accumulated value pool at twice the rate as the second player currently playing gaming device 14*b*, the first player at gaming device 14*a* has increased their odds of winning the group bonus event. In this embodiment, when selecting a winner, if any, the central server takes into account each player's side bet in comparison to the side bets of any other players. In these embodiments, a predefined relationship exists between the amount of a player's side bet and the player's odds of winning the group bonus event. It should be appreciated that any appropriate weighting method could be used as well as any appropriate betting requirements. In various alternative embodiments, the relationship between the amount of a player's side bet and the player's odds of winning the group bonus event could be linear, substantially linear, or non-linear.

As indicated by block 88, outcomes are determined for each of the wagered-on plays of the primary games. It should be appreciated that when a player places the side bet in addition to the wager for the primary game, the side bet does not affect primary game play. The average expected payout of the primary game on each player's gaming device is based on the paytable employed in that primary game. The symbol combinations of the paytable, the chance of the symbol combinations occurring, and their respective awards determine the average expected payback for the primary game. Placing the side bet in addition to the wager enables a player to continue participating in the group bonus event, but does not affect the paytable of the primary game. Accordingly, challenged players who decline to participate in the group bonus event and, therefore, do not place the side bet, continue playing the primary games of their respective gaming devices with the primary game paytable.

As indicated by diamond 90, the central controller determines whether a group bonus event winning condition occurs. If the group bonus event winning condition has not occurred, the players continue playing the primary games, as indicated by block 82. In certain embodiments, each of the players who agreed to participate in the group bonus event continues competing for the amount in the group bonus meter until one of the players wins the group bonus event, one of the players stops playing the primary game, or one of the players stops making the required side bet in the primary game. In various alternative embodiments, a player will be considered to have stopped playing when: (i) a designated amount of time has elapsed wherein the player has not placed a wager to play the primary game, (ii) the player's rate of play drops below a designated level, (iii) when the credit meter is at zero for a designated amount of time, (iv) when the cash-out button has been pressed, or (iv) when any other suitable criteria is met. If it is determined that a player has stopped playing or stopped making the side bets to fund the accumulated value pool, that player forfeits his or her stake in the group bonus event. Thus, any side bets that were placed by that player remain in the accumulated value pool.

If it is determined that the group bonus event winning condition has occurred, the central controller identifies the gaming device on which the group bonus event winning condition occurs, as indicated by block 92. The player playing at the gaming device on which the group bonus event winning condition occurs wins the group bonus event and is provided with the amount displayed in the group bonus meter, as indicated by block 94.

In other embodiments, the players participating in the group bonus event are playing for one or more prizes in addition to, or instead of, the amount in the bonus meter. For example, in certain embodiments, the players may be competing for merchandise or for bonus features. In one alternative embodiment, the players participating in the group bonus event are competing for one of a plurality of award pools associated with the gaming system. In one such embodiment, each time a player makes a wager to play the primary game, a portion of the wager is added to one or more of the award pools. In one such embodiment, each player's wager is divided over each of the pools. For example, 5% of each wager goes to a silver pool, 25% of each wager goes to a gold pool, and 70% each wager goes to a platinum pool. The player who wins the bonus event wins the amount that has accumulated in the platinum pool. In such an embodiment, one or more non-winning players may be provided with the amounts that have accumulated in the silver and gold pools. In such embodiments, which pool is awarded to which non-winning player may be randomly determined, determined based on player status, determined based on each player's performance in the bonus game, or determined in any other suitable manner.

It should be appreciated that the group bonus event winning condition can be any suitable condition or event. In one embodiment, the group bonus event winning condition is a symbol-driven event, such as an occurrence of a designated symbol or symbol combination, during a play of the primary game on one of the gaming devices in the gaming system. In another embodiment, the group bonus event winning condition is based on another event based on game play. In other embodiments, the group bonus event winning condition is based on events that are random and independent of game play, such as a randomized time or set time of day. In different embodiments, the group bonus event winning condition may be based on at least one of: (i) an amount of time played on one or more or the gaming devices; (ii) a random time of the day; (iii) an amount of money wagered on one or more of the gaming devices; (iv) an amount of money lost by one or more of the gaming devices; (v) an amount of money won by one or more of the gaming devices; (vi) upon an event or outcome occurring in the primary game of one of the gaming devices; (vii) upon an event occurring due to a shared random outcome generation; (viii) any other suitable triggering event; and (ix) any combination of the above.

In one embodiment, when the players agree to participate in the group bonus event, the central controller imposes a time limit for the group bonus event. In one such embodiment, the group bonus event winning condition includes accomplishing a designated condition within the designated amount of time. For example, the player who generates the highest number of a designated symbol in the primary game during the time period wins the group bonus event. In various different embodiments where the group bonus event occurs within a limited time period, the group bonus event winning condition includes: (i) wagering the most (i.e., the largest amount wagered) during the time period; (ii) winning the most during the time period; (iii) losing the most during the time period; (iv) placing the highest wager on any single play during the time period; (v) placing the lowest wager on any single play during the time period; (vi) obtaining the highest number of a designated symbol in the primary game during the time period; (vii) obtaining the lowest number of a designated symbol in the primary game during the time period (viii) any other suitable criteria; and (ix) any combination of the above.

In one embodiment, each of the gaming devices in the gaming system is associated with a primary or base game operable upon a wager and a secondary or bonus game operable upon a triggering event. In such an embodiment, the group bonus event winning condition is met when one of the gaming devices triggers the secondary or bonus game associated with that gaming device. The first player participating in the group bonus event to trigger the secondary or bonus game on his or her respective gaming device wins the group bonus event. In such an embodiment, the longer it takes to for one of the players to trigger his or her secondary or bonus game, the greater the amount that is provided to the winner of the group bonus event.

In one embodiment, each of the players participating in the group bonus event has an equal chance of winning the group bonus event. In various alternative embodiments, a player's chance of winning the group bonus event is based on one or more of: (i) the player's status, (ii) the player's rate of play, (iii) the player's wager level, or (iv) any other suitable criteria. In certain embodiments, players who are wagering greater amounts on plays of the primary game or players wagering more frequently in the primary game will have a better chance of winning the group bonus event.

In certain embodiments, the gaming devices provide information to the players regarding each competing player's chance of winning the bonus event at any point in time during game play. In different embodiments, the information may be displayed by the display device of each player's individual gaming device or by a shared display associated with the gaming system. In one example embodiment, each gaming device displays each players' rate of play and the corresponding chance of winning the bonus event for each player. Each of the players participating in the group bonus event can use this information to adjust his or her respective rate of play and thereby influence the probability that he or she will win the group bonus event.

Once one of the players wins the group bonus event, the other players who were participating in the group bonus event are notified. The central controller determines whether the players wish to continue participating in the group bonus event for another round, as indicated by diamond 96. In one embodiment, all of the players who participated in the group bonus event must agree to continue the group bonus event for another round. In another embodiment, less than all of the players who participated in the group bonus event can agree to continue participating in the group bonus event for another round.

Accordingly, the present disclosure enables players playing at gaming devices in a gaming system to engage in a competitive group bonus event. It should be appreciated that, in some embodiments, once players agree to participate in the group bonus event, one or more of the players may subsequently have the opportunity to invite other players playing at adjacent gaming devices to join the group bonus event. Thus, the group bonus event is not limited to the challenging player and those players initially challenged by the challenging player. That is, it can continue to grow. In various alternative embodiments, the participants in the group bonus event may be playing at gaming devices in a single location within a gaming establishment, gaming devices within a single gaming establishment, or a network of remotely located gaming devices.

Figure 5A:
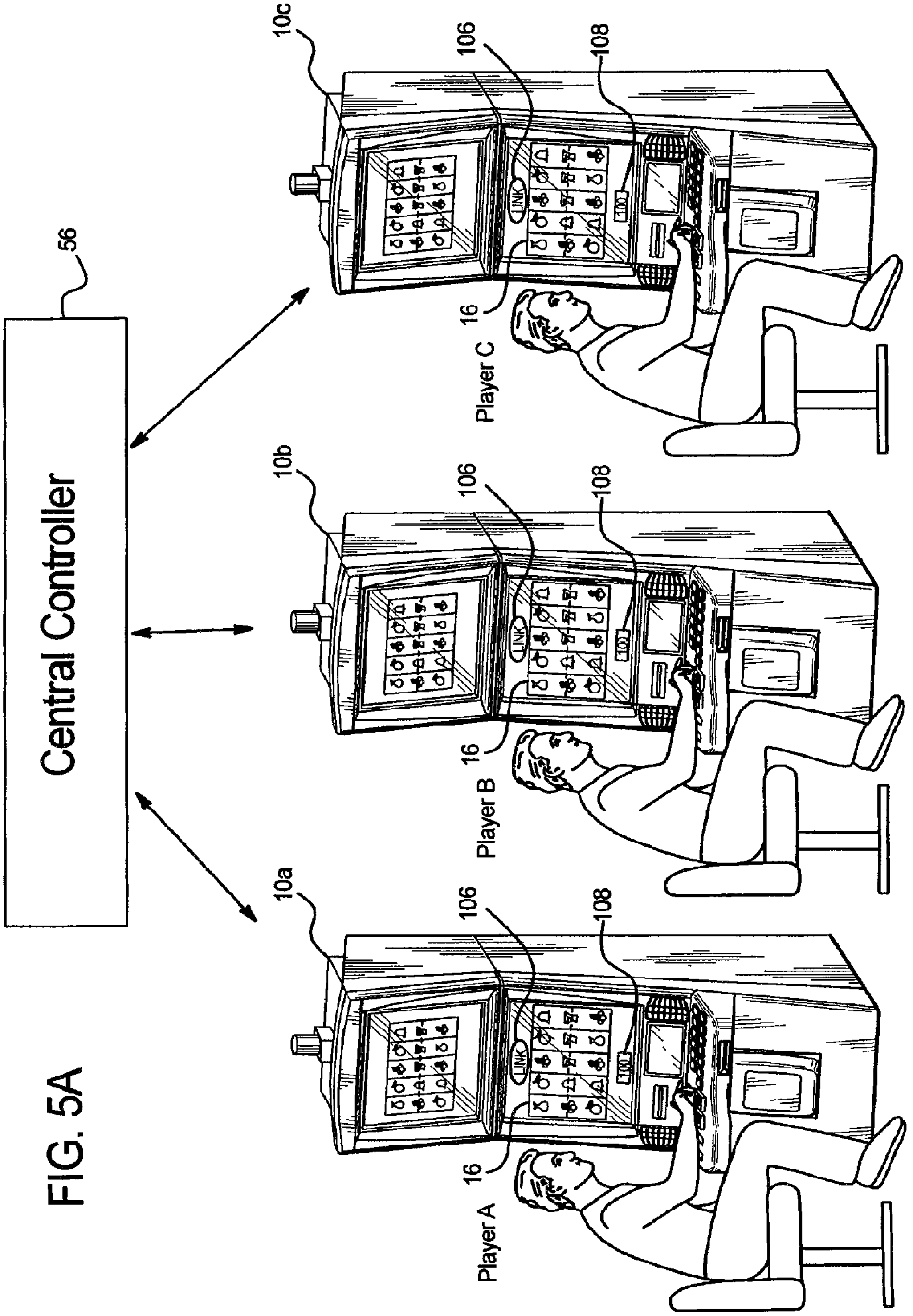
FIGS. 5A and 5B are diagrams illustrating one example embodiment of present disclosure, wherein three players are participating in the group bonus event.

Referring now to FIG. 5A, a plurality of linked gaming devices 10*a*, 10*b*, and 10*c* are associated with a group bonus event. Each of the gaming devices 10*a*, 10*b*, and 10*c* includes a primary game operable on a wager and a bonus game operable upon an occurrence of a triggering event. Player A, Player B, and Player C, who are playing at gaming devices 10*a*, 10*b*, and 10*c*, respectively, are participating in the group bonus event, as indicated by the indication 106 on each of their gaming devices 10*a*, 10*b*, and 10*c*. In this embodiment, the indication 106 that a gaming device is participating in the group bonus event is provided on each gaming device's display device. It should be appreciated that the present disclosure contemplates employing one or more displays in conjunction with the gaming devices which will provide the players of the gaming devices information about the group bonus event to increase player awareness of the group bonus event and interaction between players of the gaming devices. The display(s) can provide any suitable information about the gaming system, gaming devices, bonus events, and bonus awards, such as information regarding the group bonus event.

In one embodiment, the gaming system includes a shared display configured to display information regarding the group bonus event. In one embodiment, the shared display is connected to or is adjacent to a plurality or all of the gaming devices of the gaming system. In one such embodiment, the gaming devices are positioned and spaced apart substantially equally about the shared display. In one such embodiment, the shared display is a screen or monitor. It should be appreciated that the shared display may be any suitable shape and any suitable size. In these embodiments, the shared display provides any suitable information about the group bonus events, such as information regarding which players are participating in the group bonus event and which players are not participating in the group bonus event.

In the example of FIG. 5A, as the players play the primary games of their gaming devices, a portion of the wagers placed to play the primary games are allocated to a group bonus pool associated with the group bonus event. The amount in the group bonus pool is displayed in the group bonus meter 108. The amount that has accumulated in the group bonus meter 108 is 100 credits. The first player to trigger the bonus game associated with his or her gaming device will win the amount displayed in the group bonus meter 108. In other words, triggering the bonus game on one of the gaming devices is the bonus event winning condition.

It should be appreciated that, as the players play their respective primary games, the group bonus event is taking place independently of primary game play. The group bonus event enables the players to compete for an award that is independent of any awards won by the players during the primary games. That is, participating in the group bonus event does not affect the primary games being played by the players. In addition, the group bonus event does not affect any bonus games associated with the individual gaming devices, as further discussed below in connection with FIG. 5B.

As seen in FIG. 5A, Player C's gaming device 10*c* has generated five bonus symbols on the center payline 52 in the illustrated reel spin of the primary game. This is the triggering event for the bonus game of gaming device 10*c*. Accordingly, Player C wins the group bonus event because Player C is the first player to trigger the bonus game associated with his gaming device.

Figure 5B:
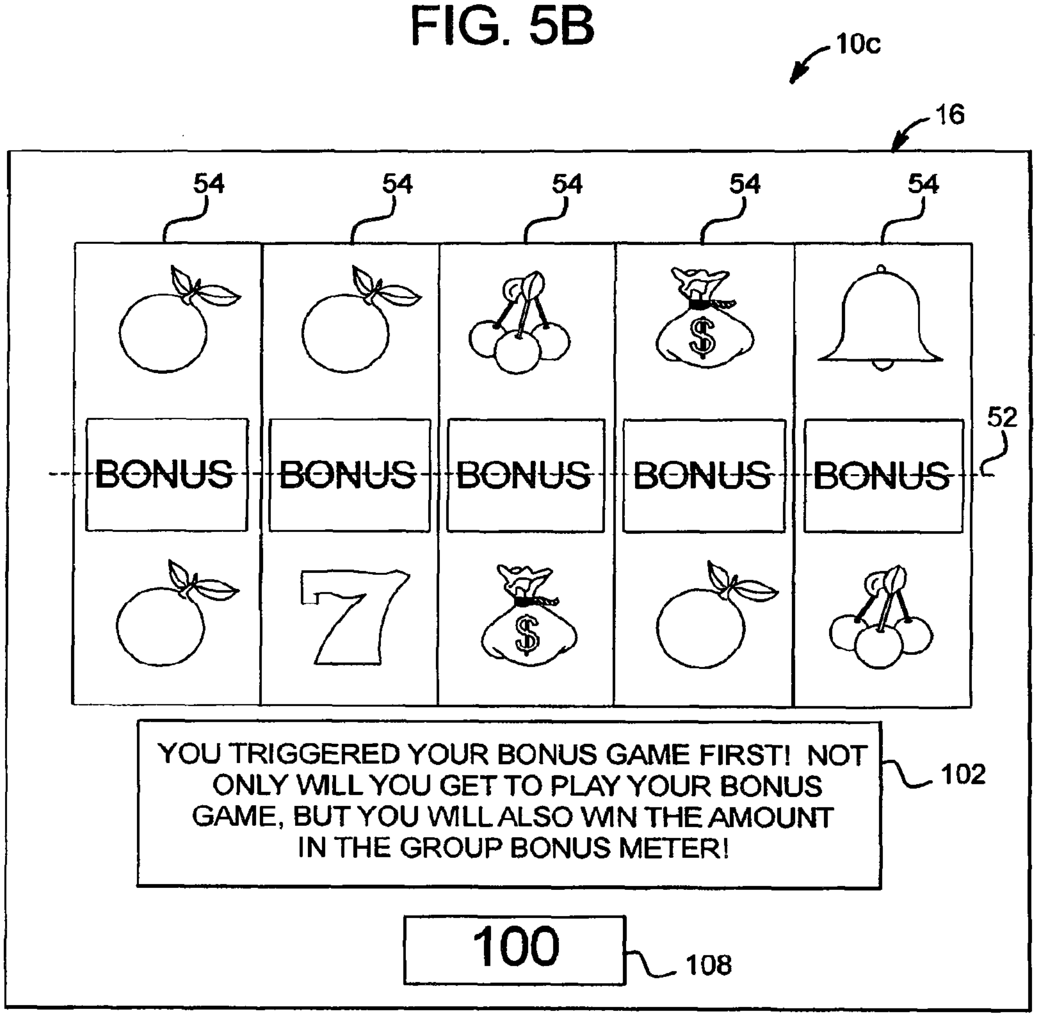

FIG. 5B shows a display screen which appears on Player C's gaming device 10*c* after Player C has triggered the bonus game of gaming device 10*c*. The display screen includes a message box 102 which informs Player C that Player C was the first of the players participating in the group bonus event to trigger the bonus game of his gaming device. Therefore, Player C wins the amount displayed in the group bonus meter (i.e., 100 credits) and, in addition, Player C will have the opportunity to play the bonus game.

In one embodiment, the present disclosure is implemented as a table top or pub-style game. Such an embodiment is ideally suited for but not necessarily limited to bar play. Bar games are very popular, and creating challenges within the game will increase player participation. In one such embodiment, the game platform may be mounted in a bar top or on the wall, and has controls built into the table top. In one embodiment, the game platform includes one or more adjustable screens. In one embodiment, the screens are flat screen monitors. In one embodiment, the game platform is designed to rotate from a flat, recessed position flush with the bar or table top to 90 degrees from the bar or table top.

In one alternative embodiment, the gaming system of the present disclosure is associated with one or more progressive awards adapted to be provided to one or more players playing at the gaming devices. In one such embodiment, the gaming system maintains a set of progressive awards that are only available to players who are participating in the group bonus event. In one such embodiment, the players participating in the group bonus event are eligible to win one of the progressive awards from the separate set of progressive awards in addition to any progressive awards that may be associated with their respective gaming devices during standard game play. In such embodiments, players who accept a challenge to participate in the group bonus event can play for multiple different progressive awards, even if they are not playing on a gaming device that is formally associated with those progressives. Such a gaming system enables players to compete against other players for multiple progressives simultaneously or in an over-lapping manner.

In another embodiment, a gaming system is associated with a plurality of progressive awards that start at different levels or have different base levels, such as $10, $100, $1000 and $10,000. In one such embodiment, players who agree to participate in the group bonus event are competing for one of the levels of the multiple level progressive ("MLP"). In one such embodiment, the group bonus event is set to last for a designated period of time (i.e., a challenge period). In different embodiments, the challenge period may be a day, a weekend, a week, or any other suitable amount of time. During the challenge period, the players participating in the group bonus event will compete in one or more challenges. The player who accumulates the greatest number of victories during the challenge period is the winner of the group bonus event. In one embodiment, the player determined to be the winner of the group bonus event at the end of the challenge period wins the first or highest progressive level. The player who wins the second-highest number of victories during the challenge period wins the second progressive level, and so on.

In various alternative embodiments, once one of the players is selected to be provided one of the progressive awards, the central controller determines which progressive award or progressive award level to award to that player based on: (i) a generated symbol or symbol combination, (ii) a random determination by the central controller, (iii) a random determination at a gaming device, (iv) one or more side wagers placed, (v) a predetermined event, (vi) randomly determined event, (vii) the player's status (such as through a player tracking system), (viii) time (such as the time of day), or based on any other suitable method or criteria.

It should be appreciated that one or more of the progressive awards may each be funded, at least in part, based on the wagers placed on the primary games of the gaming devices in the gaming system. In one embodiment, one or more of the progressive awards increment or increase based on side-bets placed by the players. In one such embodiment, after or upon agreeing to participate in the group bonus event, each of the players must place a side bet in addition to the wager placed to play the primary game on his or her respective gaming device. In one such embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a controller; and a plurality of gaming devices each configured to communicate with the controller, each of the gaming devices including:

(i) an acceptor configured to receive a physical item associated with a monetary value to facilitate establishing a credit balance based on the monetary value;

(ii) a wager button;

(iii) at least one primary game operable upon placement of a first wager by a player via actuation of the wager button, the first wager deductible from the credit balance;

(iv) at least one secondary game operable upon a secondary game triggering event;

(v) at least one display device configured to display said at least one primary game and said at least one secondary game; and (vi) a cashout button actuatable to initiate a payout associated with the credit balance, wherein the controller and the gaming devices are configured to:

(a) enable a first player playing at one of the gaming devices to challenge at least one other player playing at another one of the gaming devices to participate in a group competition in which the first player and any of the challenged players who accept the first player's challenge compete to obtain one of the secondary game triggering events, (b) determine if any of the challenged players accept the first player's challenge to participate in the group competition, and (c) if any of the challenged players accept the first player's challenge:

(i) for each of the gaming devices at which the players who accept the first player's challenge are playing and the gaming device at which the first player is playing, cause said gaming device to enable the player playing at said gaming device to place:

(A) the first wager to play the primary game, the first wager being deductible from the credit balance of said player, and (B) a second wager in addition to the first wager using the credit balance, the second wager being associated with the group competition and deductible from the credit balance of said player, (ii) allocate a portion of an amount of each placed second wager to an accumulated value pool associated with the group competition, (iii) cause a display of any amounts allocated to the accumulated value pool in a group competition meter, (iv) repeat (c)(i) to (c)(iii) until one of the secondary game triggering events occurs on one of the gaming devices participating in the group competition, and (v) after said secondary game triggering event occurs on said gaming device:

(A) identify the player playing at said gaming device as a winner of the group competition, (B) cause the credit balance of said winner of the group competition to be increased by the amount displayed in the group competition meter, and (C) enable said winner of the group competition to play the secondary game associated with said secondary game triggering event.

2. The gaming system of claim 1, wherein the group competition is activated upon a group competition activating event.

3. The gaming system of claim 2, wherein the controller and the gaming devices are configured to, upon an occurrence of the group competition activating event, identify one of the plurality of gaming devices as an activating gaming device and enable the player playing at said activating gaming device to challenge at least one other player playing at another one of the gaming devices to participate in the group competition.

4. The gaming system of claim 1, wherein, for each player participating in the group competition, if said player does not place the second wager in addition to the first wager, the controller is configured to discontinue the group competition with respect to said player.

5. The method of claim 1, which includes, for each player participating in the group competition, if said player does not place the second wager in addition to the first wager, causing the controller to discontinue the group competition with respect to said player.

6. A method of operating a gaming system, said method comprising:

(a) enabling a first player playing at one of a plurality of gaming devices to challenge at least one other player playing at another one of the gaming devices to participate in a group competition in which the first player and any of the challenged players who accept the first player's challenge compete to obtain one of the secondary game triggering events, each gaming device including:

(i) an acceptor configured to receive a physical item associated with a monetary value to facilitate establishing a credit balance based on the monetary value;

(ii) a wager button;

(iii) at least one primary game operable upon placement of a first wager by a player via actuation of the wager button, the first wager deductible from the credit balance;

(iv) at least one secondary game operable upon a secondary game triggering event;

(v) at least one display device configured to display said at least one primary game and said at least one secondary game; and (vi) a cashout button actuatable to initiate a payout associated with the credit balance;

(b) causing a controller to determine if any of the challenged players accept the first player's challenge to participate in the group competition, and (c) if any of the challenged players accept the first player's challenge:

(i) causing the controller to, for each of the gaming devices at which the players who accept the first player's challenge are playing and the gaming device at which the first player is playing, cause said gaming device to enable the player playing at said gaming device to place:

(A) the first wager to play the primary game, the first wager being deductible from the credit balance of said player, and (B) a second wager in addition to the first wager using the credit balance, the second wager being associated with the group competition and deductible from the credit balance of said player, (ii) causing the controller to allocate a portion of an amount of each placed second wager to an accumulated value pool associated with the group competition, (iii) causing the controller to cause a display of any amounts allocated to the accumulated value pool in a group competition meter, (iv) repeating (c)(i) to (c)(iii) until one of the secondary game triggering events occurs on one of the gaming devices participating in the group competition, and (v) after said secondary game triggering event occurs on said gaming device:

(A) causing the controller to identify the player playing at said gaming device as a winner of the group competition, (B) causing the controller to cause the credit balance of said winner of the group competition to be increased by the amount displayed in the group competition meter, and (C) enabling said winner of the group competition to play the secondary game associated with said secondary game triggering event.

7. The method of claim 6, which includes causing the processor to activate the group competition upon a group competition activating event.

8. The method of claim 7, which includes, upon an occurrence of the group competition activating event, causing the controller to identify one of the plurality of gaming devices as an activating gaming device and enable the player playing at said activating gaming device to challenge at least one other player playing at another one of the gaming devices to participate in the group competition.

9. The method of claim 6, which is provided through a data network.

10. The method of claim 9, wherein the data network is an internet.

11. A gaming system comprising:

at least one processor; and at least one memory device that stores a plurality of instructions which, when executed by the at least one processor, cause the at least one processor to:

(a) receive, from a first one of a plurality of gaming devices, a request from a first player of said first gaming device to challenge at least one player of at least one other one of the gaming devices to participate in a group competition;

(b) for each challenged player, cause the gaming device of said challenged player to present the first player's challenge to said challenged player and to enable said challenged player to accept or decline the first player's challenge;

(c) for each challenged player, determine whether said challenged player accepts the first player's challenge; and (d) if any of the at least one challenged player accepts the first player's challenge:

(i) initiate the group competition, wherein the first player and any challenged player who accepted the first player's challenge can play a primary wagering game during the group competition following establishment of a credit balance for said player responsive to receipt, by an acceptor, of a physical item associated with a monetary value, the credit balance decreasable responsive to an actuation of a cashout button;

(ii) for each of one or more plays of the primary wagering game during the group competition, increase an accumulated value pool associated with the group competition; and (iii) when a secondary game triggering event occurs in association with one of the gaming devices participating in the group competition:

(A) indicate that the player of said gaming device is a winner of the group competition, (B) cause the player of said gaming device to be provided with a group competition award based on the accumulated value pool, the credit balance of the player of said gaming device being increasable by said group competition award, and (C) enable the player of said gaming device to play a secondary game associated with said secondary game triggering event.

12. The gaming system of claim 11, wherein the plurality of instructions, when executed by the at least one processor, cause the at least one processor to determine a group of players from which the first player may select the at least one challenged player.

13. The gaming system of claim 12, wherein the plurality of instructions, when executed by the at least one processor, cause the at least one processor to determine the group of players based on at least one selected from the group consisting of: (a) a status of the first player in a player tracking system, (b) a wager level of the first player, and (c) a likelihood of the first player winning the group competition.

14. The gaming system of claim 11, wherein the plurality of instructions, when executed by the at least one processor, cause the at least one processor to receive the request from the first player of the first gaming device after an occurrence of a group competition activation event.

15. A method of operating a gaming system, said method comprising:

(a) causing at least one processor to execute a plurality of instructions to receive, from a first one of a plurality of gaming devices, a request from a first player of said first gaming device to challenge at least one player of at least one other one of the gaming devices to participate in a group competition;

(b) causing the at least one processor to execute the plurality of instructions to, for each challenged player, cause the gaming device of said challenged player to present the first player's challenge to said challenged player and to enable said challenged player to accept or decline the first player's challenge;

(c) causing the at least one processor to execute the plurality of instructions to, for each challenged player, determine whether said challenged player accepts the first player's challenge; and (d) if any of the at least one challenged player accepts the first player's challenge, causing the at least one processor to execute the plurality of instructions to:

(i) initiate the group competition, wherein the first player and any challenged player who accepted the first player's challenge can play a primary wagering game during the group competition following establishment of a credit balance for said player responsive to receipt, by an acceptor, of a physical item associated with a monetary value, the credit balance decreasable responsive to an actuation of a cashout button;

(ii) for each of one or more plays of the primary wagering game during the group competition, increase an accumulated value pool associated with the group competition; and (iii) when a secondary game triggering event occurs in association with one of the gaming devices participating in the group competition:

(A) indicate that the player of said gaming device is a winner of the group competition, (B) cause the player of said gaming device to be provided with a group competition award based on the accumulated value pool, the credit balance of the player of said gaming device being increasable by said group competition award, and (C) enable the player of said gaming device to play a secondary game associated with said secondary game triggering event.

16. The method of claim 15, which includes causing the at least one processor to execute the plurality of instructions to determine a group of players from which the first player may select the at least one challenged player.

17. The method of claim 15, which includes causing the at least one processor to execute the plurality of instructions to receive the request from the first player of the first gaming device after an occurrence of a group competition activation event.

18. The method of claim 17, which includes causing the at least one processor to execute the plurality of instructions to determine the group of players based on at least one selected from the group consisting of: (a) a status of the first player in a player tracking system, (b) a wager level of the first player, and (c) a likelihood of the first player winning the group competition.

19. The method of claim 15, which is provided through a data network.

20. The method of claim 19, wherein the data network is an internet.

* * * * *